United States Patent [19]
Melville

[11] Patent Number: 6,049,407
[45] Date of Patent: Apr. 11, 2000

[54] PIEZOELECTRIC SCANNER

[75] Inventor: Charles D. Melville, Issaquah, Wash.

[73] Assignee: University of Washington, Seattle, Wash.

[21] Appl. No.: 09/072,022

[22] Filed: May 4, 1998

Related U.S. Application Data

[63] Continuation-in-part of application No. 09/009,760, Jan. 20, 1998, Pat. No. 5,982,528.

[60] Provisional application No. 60/045,855, May 5, 1997.

[51] Int. Cl.[7] ................................................ G02B 26/08
[52] U.S. Cl. .......................... 359/198; 359/199; 359/213; 359/214; 359/223; 359/900
[58] Field of Search ................................... 359/197–199, 359/213–214, 223, 224, 900; 310/316, 317

[56] References Cited

U.S. PATENT DOCUMENTS

| | | | |
|---|---|---|---|
| 4,063,287 | 12/1977 | van Rosmalen . | |
| 4,859,846 | 8/1989 | Burrer . | |
| 4,902,083 | 2/1990 | Wells . | |
| 5,121,138 | 6/1992 | Schermer et al. . | |
| 5,251,056 | 10/1993 | Lee | 359/224 |
| 5,280,163 | 1/1994 | Barkan . | |
| 5,444,565 | 8/1995 | Goto | 359/224 |
| 5,467,104 | 11/1995 | Furness, III et al. . | |
| 5,488,862 | 2/1996 | Neukermans et al. . | |
| 5,550,669 | 8/1996 | Patel | 359/224 |
| 5,557,444 | 9/1996 | Melville et al. . | |
| 5,596,339 | 1/1997 | Furness, III et al. . | |
| 5,629,790 | 5/1997 | Neukermans et al. . | |
| 5,648,618 | 7/1997 | Neukermans et al. . | |
| 5,671,076 | 9/1997 | Matsubara et al. . | |
| 5,694,237 | 12/1997 | Melville . | |
| 5,701,132 | 12/1997 | Kollin et al. . | |
| 5,715,337 | 2/1998 | Spitzer et al. | 385/4 |

FOREIGN PATENT DOCUMENTS 0473343  3/1992  European Pat. Off. .

*Primary Examiner*—James Phan
*Attorney, Agent, or Firm*—Steven P. Koda

[57] ABSTRACT

A first piezoelectric actuator is located on a first support of a mirror. The first support is elongated having a first portion to one edge of the mirror and a second portion to an opposite edge of the mirror. The actuator drives mirror movement about a first axis of rotation which is orthogonal to a longitudinal axis of the first support. A second piezoelectric actuator is located on a second support of the mirror. The second support is elongated having a first portion to one edge of the mirror and a second portion to an opposite edge of the mirror. The second support is orthogonal to the first support. The second actuator drives mirror movement about a second axis of rotation which is orthogonal to the first axis of rotation and to a longitudinal axis of the second support.

22 Claims, 5 Drawing Sheets

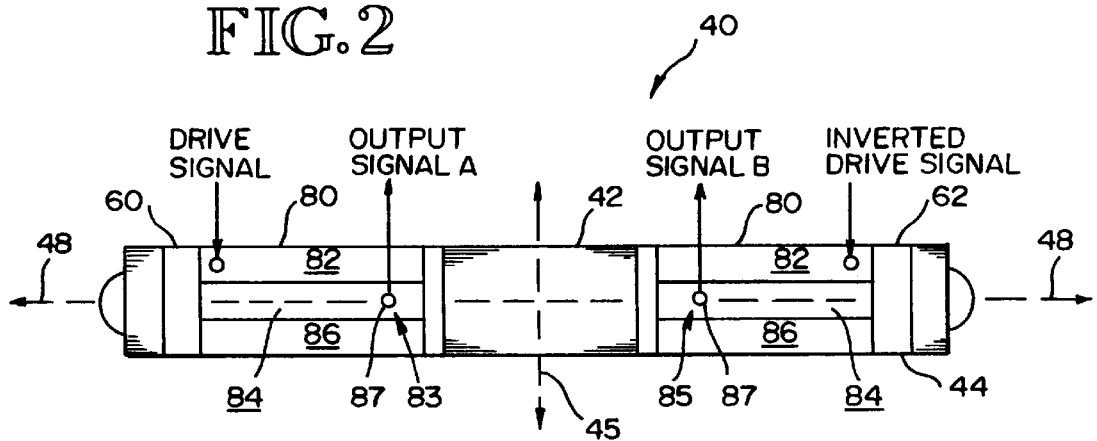
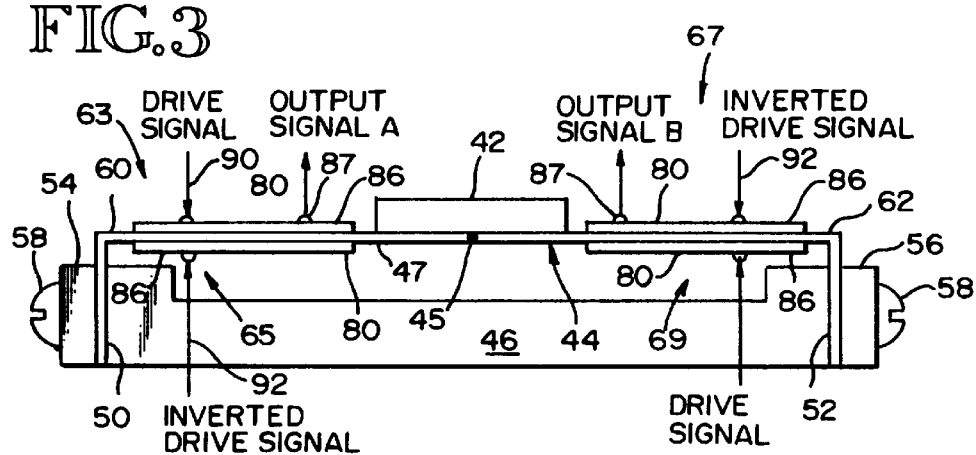
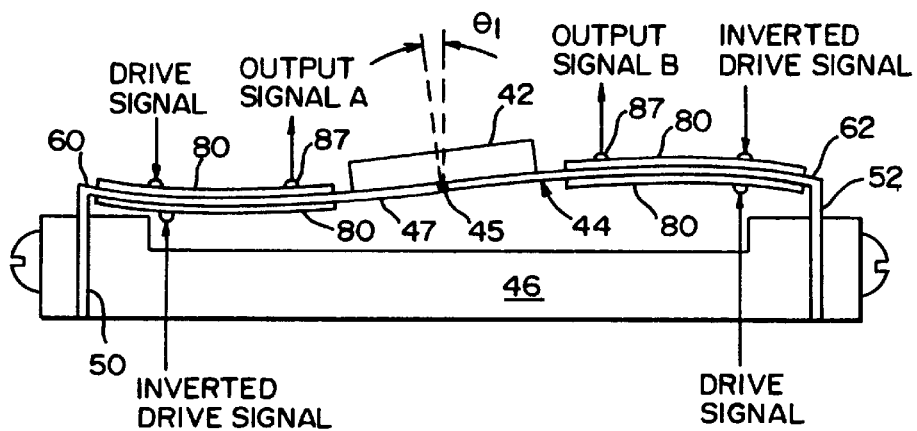

PIEZOELECTRIC SCANNER

CROSS REFERENCE TO RELATED APPLICATIONS

This application is a continuation in part of U.S. patent application Ser. No. 09/009,760 filed Jan. 20, 1998 now U.S. Pat. No. 5,982,528 for "Optical Scanner Having Piezoelectric Drive." This invention is related to U.S. Provisional patent application Ser. No. 60/045,855 filed May 5, 1997 "Piezoelectric Scanners—One and Two Axis,." The content of the both applications are incorporated herein by reference and made a part hereof.

BACKGROUND OF THE INVENTION

This invention relates to optical scanner devices, and more particularly to a scanner having a mirror which moves to deflect light along a scanning path.

Resonant scanners are used in scanned light beam devices, such as retinal display devices to scan light beams. In a retinal display device the scanner scans the light beam onto the retina of an eye to produce a perceived image. In an exemplary configuration for a retinal display device one scanner is used to provide horizontal deflection of a light beam, while another scanner is used to provide vertical deflection of the light beam. Together the two scanners deflect the light beam at changing angles to define a raster or other scanning pattern. By modulating the light beam and implementing multiple colors, a color image is scanned in raster format.

Each scanner includes a mirror which receives the light beam. The respective mirrors are moved in a periodic pattern over a prescribed angle. Such movement causes deflection of the light beam. For scanning a raster pattern the periodic pattern is repeated along the horizontal and vertical axes at respective scanning rates. The prescribed angle is referred to as a deflection angle and can be defined in a variety of fashions. For example, the deflection angle may be defined as total optical scan angle (TOSA) or peak mechanical scan angle (PMSA). In the context of a retinal scanning display the scanning rate and deflection angles are defined to meet the limits of the human eye. Analogous to refreshing a pixel on a display screen, the eye's retinal receptors must receive light from the scanning light beam periodically to continually perceive an ongoing image. Accordingly, the light beam rescans the image, or a changing image, in a periodic manner. The minimum refresh rate is a function of the light adaptive ability of the eye, the image luminance, and the length of time the retinal receptors perceive luminance after light impinges. To achieve television quality imaging the refresh rate typically is selected to be at least 50 to 60 times per second (i.e., ≧50 Hz to 60 Hz). Further, to perceive continuous movement within an image the refresh rate typically is at least 30 Hz.

To define a raster pattern in which thousands, or millions, of bits of information (e.g., light pixels) are communicated onto a small area (i.e., eye retina), the position of the mirror is controlled or monitored to a high degree of accuracy. In a conventional mechanical resonant scanner, the mirror is driven by a magnetic circuit that includes a pair of permanent magnets and a pair of electromagnets. Shortcomings of such a drive mechanism include undesirable weight of the magnets.

FIG. 1 shows a conventional scanner 10 having a mirror 12 and a spring plate 14. The mirror 12 and spring plate 14 are the only moving parts. The scanner 10 also includes a base plate 16 having a pair of stator posts 18, 20. Stator coils 22, 24 are wound in opposite directions about the respective stator posts 18, 20. The coil windings are connected in series or in parallel to a drive circuit. On opposite ends of the base plate 16, permanent magnets 26, 28 are mounted equidistant from the posts 18, 20. The spring plate 14 has enlarged opposite ends 30 that rest on a pole of a respective permanent magnet. The magnets are oriented to have the same pole in contact with each end of the spring plate 14. Thus, the opposite pole of each magnet 26, 28 is located adjacent to the base plate 16. The spring plate 14, magnets 26, 28 and the base plate 16 are tightly clamped together by respective caps 34, 36.

Magnetic circuits are formed in the scanner 10 to oscillate the mirror 12 about an axis of rotation 15. A first magnetic circuit extends from the top pole of the magnet 26 to the spring plate end 30, through an arm of the spring plate and mirror 12 across a gap to the stator pole 18, then through the base plate 16 back to the permanent magnet 26. A second magnetic circuit extends a similar path but through the stator post 20 instead of the stator post 18. A third magnetic circuit extends from the top pole of the magnet 28 to the opposite spring plate end 30, through an arm of the spring plate and mirror 12 across a gap to the stator pole 18, then through the base plate 16 back to the permanent magnet 28. A fourth magnetic circuit extends a similar path but through the stator post 20 instead of the stator post 18. A periodic drive signal is applied to the oppositely wound coils 22, 24 creating magnetic fields which cause the mirror 12 to oscillate back and forth about the axis of rotation 15. The phase angle of the mirror is not detected. A pair of frequency adjustment screws 37, 38 can be adjusted to increase or decrease the tension in the spring plate 14. Variation of such tension increases or decreases the resonant frequency of the scanner 10.

SUMMARY OF THE INVENTION

According to the invention, a piezoelectric actuator is implemented to drive mirror movement within an optical scanner. Unlike the previously described scanner, an optical scanner of this invention uses a piezoelectric mechanism instead of a magnetic circuit.

According to one aspect of the invention, the scanner is a resonant scanner having a high Q mirror system, a support and a piezoelectric actuator. The support includes or carries the reflective surface and moves in response to the piezoelectric actuator. The support alternately moves relative to an axis of rotation in a first longitudinal direction and a second longitudinal direction. In a preferred embodiment the support is a torsion spring subjected to a longitudinal force which moves the spring along the axis in the first direction or second direction. The torsion spring provides a restoring force to restore the spring when the longitudinal force decreases below a threshold and becomes insufficient to overcome the restoring force. The movement in the first direction occurs between a first extreme rotational position and a second extreme rotational position. The movement in the second direction occurs between the second extreme rotational position and the first extreme rotational position. An advantage of the spring quality and restoring force is that a resonant 'pendulum-like' system is achieved by adding a relatively small proportion of energy to the system at each swing (e.g., rotation or twist). The longitudinal force moves the support in the first direction. The restoring force returns the support along the second direction toward the relaxed position. Another longitudinal force then moves the support further along the second direction. A restoring force then moves the support in the firs direction back toward the relaxed position. Periodic timing of these forces results in an oscillatory motion of the support back and forth in the first direction and the second direction.

The reflective surface moves with the support, such that the alternate rotation of the support about the axis of rotation defines an oscillatory motion of the reflective surface. The motion of the reflective surface changes the deflection angle of light to scan light along a desired path (e.g., a horizontal line scan or a 2-dimensional raster scan).

According to another aspect of the invention, the piezoelectric actuator is mounted, adhered, integrated or otherwise mechanically coupled to the support. In a single-axis piezoelectric scanner embodiment, the support includes two arms. The arms are located at opposing edges or borders of the reflective surface. At least a first piezoelectric volume and a second piezoelectric volume are located at each arm. One of the volumes is located along a top side of the arm. The other arm is located along the bottom side of the arm. The first and second volumes receives a sinusoidal input signal of common frequency and opposite polarity. One signal is referred to as a first drive signal. The other signal is referred to as a second drive signal. Further, the top volume on one arm receives the same input signal as the bottom volume on the other arm. During a first portion of a drive cycle the first piezoelectric volumes receive the first drive signal causing the first piezoelectric volumes to deform. In addition, the second piezoelectric volumes receive the second drive signal causing the second piezoelectric volumes to deform. Because the second drive signal is of opposite polarity to the first drive signal, the second piezoelectric volumes deform in a manner opposite the deformation of the first piezoelectric volumes. The deformation of the first piezoelectric volumes and the second piezoelectric volumes in response to the first drive signal and second drive signal cause the support to rotate in the first longitudinal direction between the first extreme rotational position and the second extreme rotational position. During a second portion of the drive cycle the polarity of the first drive signal and the second drive signal reverse again causing the first piezoelectric volumes to deform and the second piezoelectric volumes to deform. The first piezoelectric volumes deforms in a manner opposite deformation of the second piezoelectric volumes. The deformation of the first piezoelectric volumes and the second piezoelectric volumes during the second portion of the drive cycle causes the support to rotate in the second longitudinal direction between the second extreme rotational position and the first extreme rotational position.

According to another aspect of the invention, a two axis piezoelectric scanner includes a support having four arms. Two arms are located at first opposing edges or borders of the reflective surface. The other two arms are located at second opposing edges or borders along an orthogonal axis of the reflective surface. A first set of opposing arms is configured as described above for the signal axis scanner embodiment. The drive signals input to the piezoelectric volumes on such arms cause movement of the reflective surface along a first axis. The second set of opposing arms also is configured as described above for the single axis scanner embodiment. The drive signals input to the piezoelectric volumes on such other arms cause movement of the reflective surface along a second axis. The drive signals for controlling motion along the first axis may be the same or different than those for controlling motion along the second axis. For example, the drive signals for controlling motion along the first axis may define a horizontal scanning frequency, while those for controlling motion along the second axis may define a vertical scanning frequency. The horizontal scanning frequency typically is higher than the vertical scanning frequency.

One advantage of this invention is that a piezoelectric scanner can be made light in weight and small in volume relative to prior conventional optical scanner devices formed with electromagnets and/or permanent magnets. Another advantage is that multiple axis scanning can be achieved with a light weight, small volume scanner. These and other aspects and advantages of the invention will be better understood by reference to the following detailed description taken in conjunction with the accompanying drawings.

BRIEF DESCRIPTION OF THE DRAWINGS

FIG. 2 is a planar view of a one-axis piezoelectric scanner according to an embodiment of this invention;

FIG. 3 is another planar view of the piezoelectric scanner of FIG. 2;

FIGS. 4a–b are diagrams of scanner of FIG. 2 at various deflection angles;

DESCRIPTION OF SPECIFIC EMBODIMENTS

Single Axis Scanner

Figure 1:
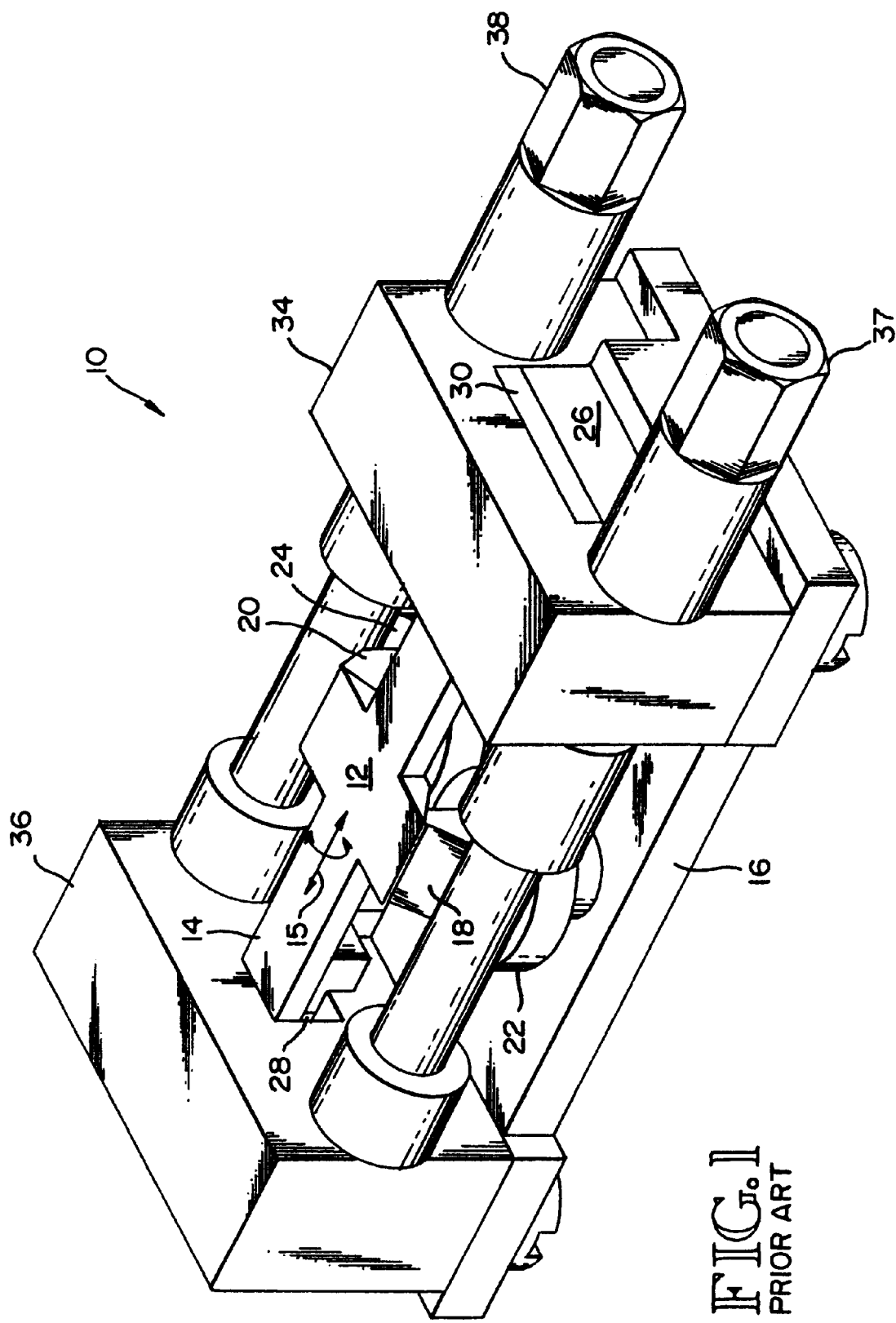
FIG. 1 is a perspective view of a conventional mechanical resonant scanner.

FIGS. 2–3 show a one-axis piezoelectric scanner 40 according to an embodiment of this invention. The scanner 40 includes a mirror 42 and a support 44. The mirror 42 is formed integral to or separate from the support 44. In one embodiment the mirror 42 is formed by a smooth, polished reflective surface area of the support 44. In another embodiment the mirror 42 is a separate structure mounted to the support 44. The scanner 40 serves to deflect light incident to the mirror 42. The support 44 is elongated having a longitudinal axis 48. The support 44 ripples along the longitudinal axis 48 causing motion of the mirror 42 about an axis of rotation 45, which is perpendicular to the longitudinal axis 48. The mirror 42 is rotated about the axis 45 between a first extreme angle and a second extreme angle at a resonant frequency. For a given drive cycle the mirror 42 is moved from an initial orientation to a first extreme angle, then back through the initial orientation to a second extreme angle, then back again to the initial orientation. Continuing drive cycles result in oscillatory motion of the mirror 42. By changing the orientation of the mirror over time, light incident to the mirror is deflected at varying angles. By repeating the changes in orientation in a cyclic manner the light is deflected across a scan path in a cyclic manner. In one implementation, the optical scanner 40 serves as a horizontal line scanner for a virtual display device. Each line of the display is generated by deflecting the light along a horizontal line scan.

The scanner 40 also includes a base plate 46 to which the support 44 is mounted, clamped, attached or otherwise anchored to the base plate 46. In one embodiment the support 44 includes an elongated portion 47 and two end portions 50, 52 bent into contact with the base plate 46. End caps 54, 56 anchor the support 44 to the base plate. Screws 58 secure the caps 54, 56 to the base plate 46. In one embodiment the support 44 is formed of spring steel and is a torsional type of spring plate which ripples or flexes along the longitudinal axis 48. The spring plate has a spring constant determined by its length, width and thickness. Preferably, the support 44 has a high Q value such that very little energy is lost during each ripple. As a result, very little energy is added during each period of movement to maintain a constant amplitude of motion of the support 44. For a high Q system the energy loss per cycle is less than 0.001%. In alternative embodiments a variety of other structures may be used to carry and move the mirror. Whereas the spring plate flexes to move the mirror, other rotational motions about the axis 45 are achieved by a support embodied as a laterally twisting spring, or an axle with bearings.

The elongated portion 47 of the support 44 has a first portion 60 to one side of the mirror 42 along the longitudinal axis 48, and a second portion 62 to the opposite side of the mirror 42 along the longitudinal axis 48. The movement (i.e., flexing, rippling) of the support 44 is driven by multiple piezoelectric actuators. Each piezoelectric actuator includes a piezoelectric volume 80 mounted, attached or integral to the support 44. In some embodiments there is a single volume 80 for each piezoelectric actuator. In another embodiment, there are multiple piezoelectric volumes 82, 84, 86 per actuator, or the volume 80 is segmented into multiple portions 82, 84, 86. The piezoelectric actuators induce a flexing motion upon the support 44 to move the mirror 42 in an oscillatory manner about the axis 45.

There are two piezoelectric actuators per portion 60, 62 of the support 44. Portion 60 includes a first piezoelectric actuator 63 along an upper surface and a second piezoelectric actuator 65 along a lower surface. Similarly, portion 62 includes a first piezoelectric actuator 67 along an upper surface and a second piezoelectric actuator 69 along a lower surface. This type of construction is referred to as a bimorph. Each piezoelectric actuator receives a drive signal which causes deformation of its component piezoelectric volume (s) 80. To induce the flexing motion the upper piezoelectric actuator 63 along portion 60 receives a noninverted drive signal 90, while the lower piezoelectric actuator 65 along portion 60 receives an inverted drive signal 92. The polarities are the opposite for the piezoelectric actuators 67, 69 along portion 62. Specifically, the upper piezoelectric actuator 67 along portion 62 receives the inverted drive signal 92, while the lower piezoelectric actuator 69 along portion 62 receives the noninverted drive signal 90. The drive signals 90, 92 are of the same magnitude and opposite polarity. To achieve an oscillatory motion of the mirror 42, the drive signals 90, 92 are periodic signals, such as square waves, sine waves, or sawtooth waves.

Preferably the piezoelectric volumes 80 are of the same volume and mass for each piezoelectric actuator 63, 65, 67, 69 so that symmetrical deformation occurs relative to the axis of rotation 45. When a piezoelectric volume 80 receives a drive signal, the shape of the piezoelectric volume 80 changes to be either shorter and fatter, or longer and thinner. The rotation of the support 44 is controlled by controlling the polarity and magnitude of the drive signals.

At rest, when no drive signals are applied, the support 44 is level relative to the base plate 46 as shown in FIG. 3.

Applying an active periodic drive signal to the piezoelectric actuator, as described above, induces flexing movement that causes rotation of the mirror 42 about the axis 45. Applying the non-inverted drive signal 90 to piezoelectric actuators 63, 69, deforms the piezoelectric volumes for such actuators 63, 69 in the same manner. Applying the inverted drive signal 92 to piezoelectric actuators 65, 67, deforms the piezoelectric volumes 80 for such actuators 65, 67 in the same manner. Because the non-inverted signals 90 received at actuators 63, 69 are of opposite polarity than the inverted signals 92 received at actuators 65, 67, the piezoelectric volumes of actuators 63, 69 deform in an opposite manner to those of actuators 65, 67.

Figure 4B:
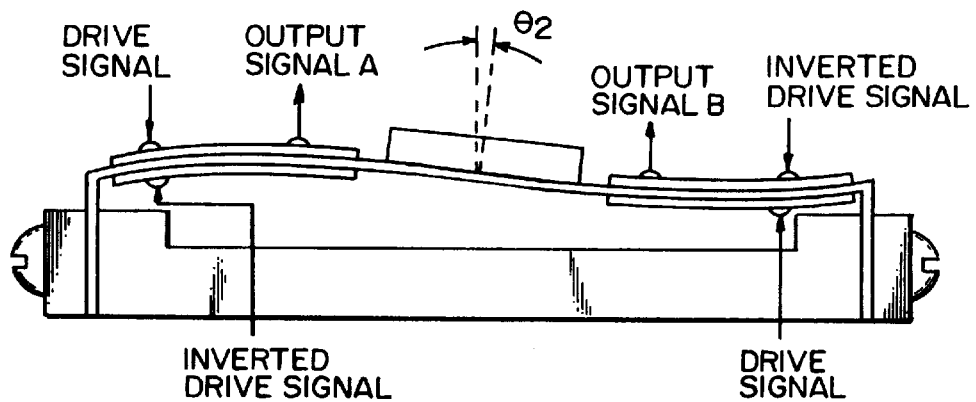
Figure 5:
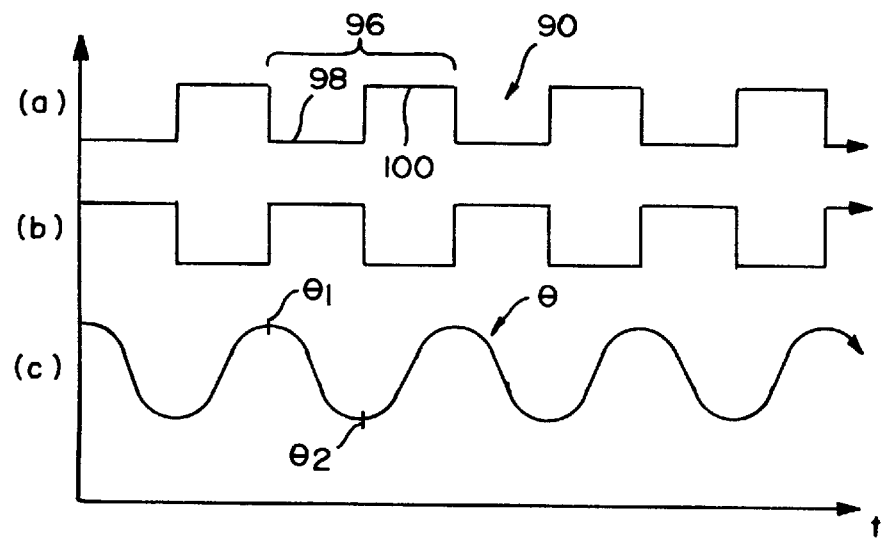
FIG. 5 is a graph of waveforms for a first drive signal, a second drive signal and deflection angle for the scanner of FIG. 2.

FIG. 4a shows the support 42 flexed to one extreme where the mirror 42 has moved about the axis 45 to a first extreme rotational offset $\theta_1$ relative to the level, rest position (see FIG. 3) of the mirror 42. FIG. 4b shows the support 42 flexed to an opposite extreme where the mirror 42 has moved about the axis 45 to a second extreme rotational offset $\theta_2$ relative to the level, rest position of the mirror 42. FIG. 5 shows respective waveforms (a), (b) and (c) for the noninverted drive signal 90, the inverted drive signal 92 and the mirror deflection angle $\theta$. Because the drive signals 90, 92 move periodically moving between a positive maxima and a negative minima, the deformation of volumes 80 change during the period 96 of the drive signals. During one portion 98 of the drive signal period 96, the polarity of noninverted drive signal 90 is negative causing the volumes of actuators 63, 69 to deform by getting shorter and fatter. During such same portion 98 of the drive signal period 96, the polarity of the inverted drive signal 92 is positive, causing the volumes 80 of actuators 65, 67 to deform by getting longer and thinner. During another portion 100 of the drive signal period 96, the polarity of noninverted drive signal 90 is positive causing the volumes of actuators 63, 69 to deform by getting longer and thinner. During such same portion 98 of the drive signal period 96, the polarity of the inverted drive signal 92 is negative, causing the volumes 80 of actuators 65, 67 to deform by getting shorter and fatter. Over many periods 96, the support 44 flexes in response to the deformation in the piezoelectric volumes causing a rippling of the support 42 back and forth along the longitudinal axis 48. The rippling moves the mirror 42 in a rotational manner about the axis of rotation 45 back and forth from a first extreme rotational position through the level position to the second extreme rotational position and back through the level position toward the first extreme rotational position.

In some embodiments portion 84 of the piezoelectric volume 80 or a separate piezoelectric volume 84 is configured as a sensor. In such embodiments each portion 84 is a respective mass 83, 85 positioned to each side of the mirror 42 along the support 44. Alternatively, additional piezoelectric masses 83, 85 can be applied to the portion 84. Corresponding electrodes 87, 89 are positioned on the portion 84 for sensing the voltage across the portion 84. In one embodiment the upper piezoelectric actuators 63, 67 each have a piezoelectric portion 84 configured as a sensor. In an alternative embodiment the lower piezoelectric actuators 65, 69 each have a piezoelectric portion 84 configured as a sensor. Each mass is equidistant from the mirror's axis of rotation 45. In response to accelerated motion of a respective portion, respective masses 83, 85 induce a changing force across the component piezoelectric material. The force causes the voltage across the piezoelectric material to vary. Changes in acceleration occur as changes in voltage. Zero acceleration corresponds to a constant "zero level" voltage output (e.g., ground or some voltage bias level). One sensor generates an output signal A. The other sensor generates an output signal B.

As the mirror 42 moves along its deflection path from one extreme orientation to another extreme orientation, the mirror accelerates and decelerates. As the mirror 42 approaches the first extreme orientation the mirror slows, then reverses direction. This corresponds to a peak acceleration point. Similarly, as the mirror 42 approaches the second extreme orientation the mirror slows again and reverses direction. This also corresponds to a peak acceleration point. The two peaks correspond to accelerations of opposite magnitude. The mirror 42 achieves maximum velocity as it moves into the level orientation. Such maximum velocity corresponds to a zero acceleration point as the mirror stops speeding up and begins slowing down. A zero acceleration point occurs each time the mirror 42 assumes the level orientation.

As the zero acceleration point approaches, the AC component of the output signal A voltage magnitude approaches a zero crossing. Similarly, the other output signal B voltage magnitude also approaches a zero crossing. The direction of voltage change for the two sensors, however, varies. One is going from positive to negative polarity, while the other is going from negative to positive polarity. The zero crossover occurs at the same time for each sensor. By monitoring the zero crossovers one can detect when the mirror 42 is in the level orientation.

Figure 6:
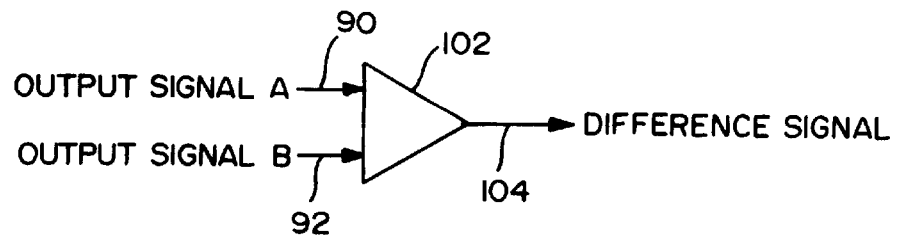
FIG. 6 is a schematic diagram of a common mode rejection circuit for the scanner of FIG. 2.

FIG. 6 shows one embodiment in which a differential amplifier 102 directly compares the output signals A, B. The amplifier 102 rejects common mode voltages. The output of the amplifier 102 is a difference signal 104, which corresponds to the difference between the voltages of the two output signals A, B. Because the amplifier 102 has a high gain, the amplifier output voltage will be high when the voltage of output signal A is higher than that of output signal B, and will be low when the voltage of output signal B is higher than that of output signal A. The gain may be selected such that the output voltage corresponds directly to the difference in the output signals A, B. In such embodiment the amplifier 102 outputs a sinusoidal signal. Alternatively, the amplifier gain may be sufficiently high that the amplifier output is fully high or fully low depending upon the relative voltages of the output signals A, B, giving an essentially digital output. Depending upon their structures, the piezoelectric sensors may respond to motion acceleration in any direction. Ideally the acceleration is only rotational about the axis of rotation 45. However, the scanner 40 itself is moving in some applications. Because the amplifier 102 is a differential amplifier that responds only to the difference between the output signals A, B, the amplifier 102 inherently ignores common mode voltages. Consequently, common motion of the masses 83, 85 does not produce changes in the output voltage. However, any motion occurring along the axis of rotation 45 is sensed by each sensor as having opposite directions, and is not subtracted out. As a result, only the voltage components corresponding to motion in the rotational direction about axis 45 cause a zero crossover to be detected. The difference signal varies over time according to the oscillating path of the mirror 42 about the axis of rotation. The difference signal 104 exhibits a zero level at each zero acceleration position of the mirror (i.e., the level orientation). Thus, the difference signal 104 indicates the phase position of the mirror.

Dual Axis Scanner Embodiment

Figure 7:
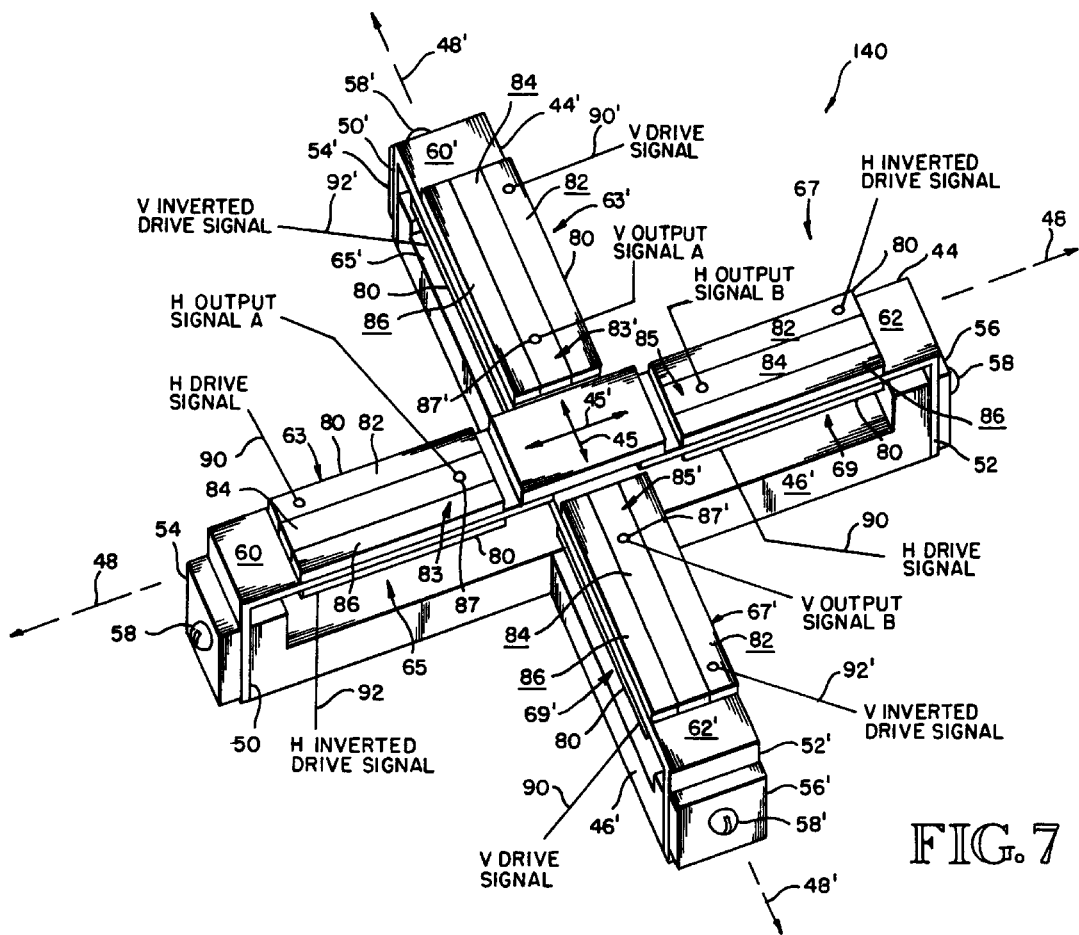
FIG. 7 is a perspective view of a two-axis piezoelectric scanner according to another embodiment of this invention.

FIG. 7 shows a dual axis scanner 140 according to an embodiment of this invention. The dual axis scanner 140 is similar to the one axis scanner of FIG. 2 with an additional support 44' positioned orthogonally to the support 44. In one embodiment the supports 44, 44' are elongated, intersecting in the shape of a cross with the mirror 42 located at the intersection. The supports 44, 44' may be formed as one integral support structure having four arm portions 60, 62, 60', 62' or as two intersecting supports. The mirror 42 is formed integral to or separate from the supports 44, 44'. In one embodiment the mirror 42 is formed by a smooth, polished reflective surface area of an integral cross-shaped support structure. In another embodiment the mirror 42 is a separate structure mounted to a cross-shaped support structure. The scanner 140 serves to deflect light incident to the mirror 42 along either of one or two axes 45, 45'. In a preferred embodiment the mirror 42 is moved about a first axis of rotation 45 by piezoelectric actuators 63, 65, 67, 69 and about a second axis of rotation 45' by piezoelectric actuators 63', 65', 67', 69'. The second axis of rotation 45 may be orthogonal to the first axis of rotation 45.

The piezoelectric actuators 63, 65 are located respectively on an upper and lower surface of arm portion 60 of support 44. The piezoelectric actuators 67, 69 are located respectively on an upper and lower surface of arm portion 62 of support 44. The piezoelectric actuators 63', 65' are located respectively on an upper and lower surface of arm portion 60' of support 44'. The piezoelectric actuators 67', 69' are located respectively on an upper and lower surface of arm portion 62' of support 44'. The piezoelectric actuators 63, 65, 67, 69 cause a flexing of the support 44 along the longitudinal axis 48. This causes movement of the mirror 42 about the axis 45. The piezoelectric actuators 63', 65', 67', 69' cause a flexing of the support 44' along the longitudinal axis 48'. This causes movement of the mirror 42 about the axis 45'.

The scanner 140 also includes a base plate 46' in the shape of a cross. The supports 44, 44' are mounted, clamped, attached or otherwise anchored to the base plate 46'. The support 44 includes an elongated portion and two end portions 50, 52 bent into contact with the base plate 46'. The support 44' includes an elongated portion and two end portions 50', 52' bent into contact with the base plate 46'. End caps 54, 56 and 54', 56' anchor the supports 44, 44', respectively, to the base plate. Screws 58 secure the caps to the base plate 46.

Each support 44, 44' is formed of spring steel and is a torsional type of spring plate which ripples or flexes along the respective longitudinal axis 48, 48'. The spring plates have a spring constant determined by length, width and thickness. Preferably, the supports 44, 44' have a high Q value such that once its spring plate starts moving very little energy is lost.

As a result, very little energy is added during each period of movement to maintain a constant frequency of motion of a given support 44, 44'. For a high Q system the energy loss per cycle can be less than 0.001%. In alternative embodiments a variety of other structures may be used to carry and move the mirror.

Each piezoelectric actuator 63–69, 63'–69' includes a piezoelectric volume 80 mounted, attached or integral to the respective support 44, 44'. In some embodiments there is a single volume 80 for each piezoelectric actuator. In another embodiment, there are multiple piezoelectric volumes 82, 84, 86 per actuator, or the volume 80 is segmented into multiple portions 82, 84, 86. The piezoelectric actuators induce a flexing motion upon the corresponding support to move the mirror 42 in an oscillatory manner about a corresponding axis of rotation.

Each piezoelectric actuator receives a drive signal which causes deformation of its component piezoelectric volume(s) 80. For controlling deflection of the mirror about the axis 45, the piezoelectric actuators 63–69 on the support 44 receive one drive signal. For controlling deflection of the mirror 42 about the axis 45', the piezoelectric actuators 63'–69' on the support 44' receive a second drive signal. In one embodiment the support 44 serves to deflect the mirror along a horizontal scan path, while the support 44' serves to deflect the mirror along a vertical scan path. Thus, the piezoelectric actuators 63, 65, 67, 69 receive a horizontal-scanning (H) drive signal, and the piezoelectric actuators 63', 65', 67', 69' receive a vertical-scanning (V) drive signal.

With respect to movement about axis 45, the flexing motion the upper piezoelectric actuator 63 along portion 60 of support 44 receives a horizontal-scanning, noninverted drive signal 90, while the lower piezoelectric actuator 65 along portion 60 receives a horizontal-scanning, inverted drive signal 92. The polarities are the opposite for the piezoelectric actuators 67, 69 along portion 62. Specifically, the upper piezoelectric actuator 67 along portion 62 receives the horizontal-scanning, inverted drive signal 92, while the lower piezoelectric actuator 69 along portion 62 receives the horizontal-scanning, noninverted drive signal 90. The drive signals 90, 92 are of the same magnitude and opposite polarity. To achieve an oscillatory motion of the mirror 42, the drive signals 90, 92 are periodic signals, such as square waves, sine waves, or sawtooth waves.

At rest, when no drive signals are applied, the support 44 is level relative to the base plate 46 as shown in FIG. 7. By applying an active periodic drive signal to the piezoelectric actuator, as described above, flexing movement occurs causing rotation of the mirror 42 about the axis 45. By applying the horizontal-scanning, non-inverted drive signal 90 to piezoelectric actuators 63, 69, the piezoelectric volumes for such actuators 63, 69 deform in the same manner. By applying the horizontal-scanning, inverted drive signal 92 to piezoelectric actuators 65, 67, the piezoelectric volumes 80 for such actuators 65, 67 deform in the same manner. Because the horizontal-scanning, non-inverted signals 90 received at actuators 63, 69 are of opposite polarity then the horizontal-scanning, inverted signals 92 received at actuators 65, 67, the piezoelectric volumes of actuators 63, 69 deform in an opposite manner to those of actuators 65, 67.

For controlling deflection of the mirror about the axis 45', the piezoelectric actuators on the support 44' receive the vertical-scanning drive signal. To induce the flexing noninverted drive signal 90', while the lower piezoelectric actuator 65' along portion 60' receives a vertical-scanning, inverted drive signal 92'. The polarities are the opposite for the piezoelectric actuators 67', 69' along portion 62'. Specifically, the upper piezoelectric actuator 67' along portion 62' receives the vertical-scanning, inverted drive signal 92', while the lower piezoelectric actuator 69' along portion 62' receives the vertical-scanning, noninverted drive signal 90'. The V drive signals 90, 92 are of the same magnitude and opposite polarity. To achieve an oscillatory motion of the mirror 42 about axis 45', the drive signals 90', 92' are periodic signals, such as square waves, sine waves, or sawtooth waves. In one embodiment the mirror motion about the axis 45' is a stepping motion. For example, a step occurs after each one-half period of the H drive signal to position the mirror 42 for scanning another horizontal line after each motion of the mirror along axis 45 from one extreme deflection angle to an opposite extreme deflection angle.

At rest, when no vertical-scanning drive signals 90', 92' are applied, the support 44' is level relative to the base plate 46' as shown in FIG. 7. By applying an active vertical scanning, drive signal to the piezoelectric actuators 63', 65', 67', 69', as described above, flexing movement occurs causing rotation of the mirror 42 about the axis 45'. By applying the vertical-scanning, non-inverted drive signal 90' to piezoelectric actuators 63', 69', the piezoelectric volumes for such actuators 63', 69' deform in the same manner. By applying the inverted drive signal 92' to piezoelectric actuators 65', 67', the piezoelectric volumes 80 for such actuators 65', 67' deform in the same manner. Because the vertical-scanning, non-inverted signals 90' received at actuators 63', 69' are of opposite polarity then the vertical-scanning, inverted signals 92' received at actuators 65', 67', the piezoelectric volumes of actuators 63', 69' deform in an opposite manner to those of actuators 65', 67'.

The mirror is rotated about the axis 45 between a first extreme angle and a second extreme angle at a resonant frequency (e.g. horizontal scanning frequency). For a given drive cycle the mirror 42 is moved from an initial orientation to a first extreme angle, then back through the initial orientation to a second extreme angle, then back again to the initial orientation. Continuing drive cycles result in oscillatory motion of the mirror 42 relative to the axis 45. By changing the orientation of the mirror over time, light incident to the mirror is deflected at varying angles. By repeating the changes in orientation in a cyclic manner the light is deflected across a scan path in a cyclic manner. FIG. 4a shows the support 42 flexed to one extreme where the mirror 42 has moved about the axis 45 to a first extreme rotational offset $\theta_1$ relative to the level, rest position (see FIG. 7) of the mirror 42. FIG. 4b shows the support 42 flexed to an opposite extreme where the mirror 42 has moved about the axis 45 to a second extreme rotational offset $\theta_2$ relative to the level, rest position of the mirror 42. Similar deflection occurs for the mirror 42 between extreme deflection angles about axis 45'.

Figure 8:
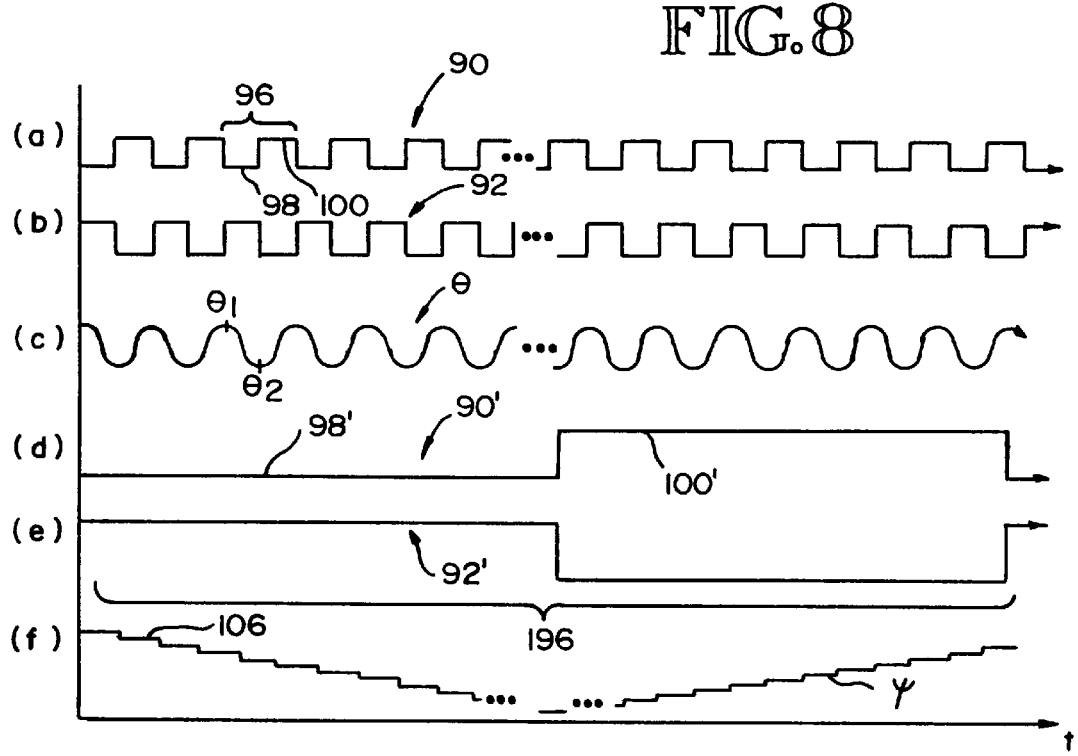
FIG. 8 is a graph of waveforms for the drive signals of the first axis and second axis piezoelectric actuators and of the mirror deflection angles along the first scanning axis and the second scanning axis for the scanner of FIG. 7.

FIG. 8 shows respective waveforms (a), (b), (c), (d), (e) and (f) for the horizontal-scanning noninverted drive signal 90, the horizontal-scanning inverted drive signal 92, the mirror deflection angle $\theta$ about axis 45, the vertical-scanning noninverted drive signal 90', the vertical-scanning inverted drive signal 92', and the mirror deflection angle $\phi$ about axis 45'. The horizontal scanning drive signals 90, 92 have a period 96. During one portion 98 of the period 96 the mirror 42 moves in one direction about axis 45. During another portion 100 of the period 96, the mirror 42 moves in the opposite direction about axis 45. The vertical scanning drive signals 90', 92' have a period 196. Note that the vertical scanning period 196 may differ from the horizontal scanning period 96. For a raster scanning embodiment, the mirror 42 moves in a step increment 106 about axis 45' for each half period of motion about axis 45. During one portion 98' of the period 196 the mirror 42 steps in one direction about axis 45'. During another portion 100' of the period 196, the mirror 42 steps in the opposite direction about axis 45'.

As described above for the one-axis scanner 40, a portion 84, 84' of the piezoelectric volume 80 or a separate piezoelectric volume 84 may be configured as a sensor. In such embodiments respective masses 83, 85, 83', 85' are positioned to each side of the mirror 42 along the supports 44, 44'. Corresponding electrodes 87, 89, 87', 89' are positioned in the portion 84 for sensing the voltage across the portion 84, 84'. In one embodiment the upper piezoelectric actuators 63, 67, 63', 67' each have a piezoelectric portion 84 configured as a sensor. In an alternative embodiment the lower piezoelectric actuators 65, 69, 65', 69' each have a piezoelectric portion 84 configured as a sensor. Each mass 83, 85 on support 44 is equidistant from the axis 45, and each mass 83', 85' on support 44' is equidistant from the axis 45'. In response to accelerated motion of a respective portion 84, 84' the respective masses 83, 85/83', 85' induce a changing force across the component piezoelectric material. The force causes the voltage across the piezoelectric material to vary. Changes in acceleration occur as changes in voltage. Zero acceleration corresponds to a constant "zero level" voltage output (e.g., ground or some voltage bias level). The masses are paired to provide one common mode rejection circuit using masses 83, 85 for motion about the axis 45 and another common mode rejection circuit using masses 83', 85' for motion about the axis 45'. FIG. 6, shows a differential amplifier 102 receiving H output signals A and B from the masses 83, 85 along support 44. The amplifier 102 rejects common mode voltages. The output of the amplifier 102 is a difference signal 104, which corresponds to the difference between the voltages of the two H output signals A, B. Because the amplifier 102 has a high gain, the amplifier output voltage will be high when the voltage of output signal A is higher than that of output signal B, and will be low when the voltage of output signal B is higher than that of output signal A. The gain may be selected such that the output voltage corresponds directly to the difference in the output signals A, B. In such embodiment the amplifier 102 outputs a sinusoidal signal. Alternatively, the amplifier gain may be sufficiently high that the amplifier output is fully high or fully low depending upon the relative voltages of the output signals A, B, giving an essentially digital output. Depending upon their structures, the piezoelectric sensors may respond to motion acceleration in any direction. Ideally the acceleration is only rotational about the axis of rotation 45. However, the scanner 40 itself is moving in some applications. Because the amplifier 102 is a differential amplifier that responds only to the difference between the output signals A, B, the amplifier 102 inherently ignores common mode voltages. Consequently, common motion of the masses 83, 85 does not produce changes in the output voltage. However, any motion occurring along the axis of rotation 45 is sensed by each sensor as having opposite directions, and is not subtracted out. As a result, only the voltage components corresponding to motion in the rotational direction about axis 45 cause a zero crossover to be detected. The difference signal varies over time according to the oscillating path of the mirror 42 about the axis of rotation. The difference signal 104 exhibits a zero level at each zero acceleration position of the mirror (i.e., the level orientation). Thus, the difference signal 104 indicates the phase position of the mirror. A similar circuit, including a differential amplifier generates a difference signal for V output signals A and B from the sensors of support 44'. One circuit assures that only mirror position about axis 45 is sensed, while the other circuit assures that only mirror position about axis 45' is sensed.

Retinal Scanning Display

Figure 9:
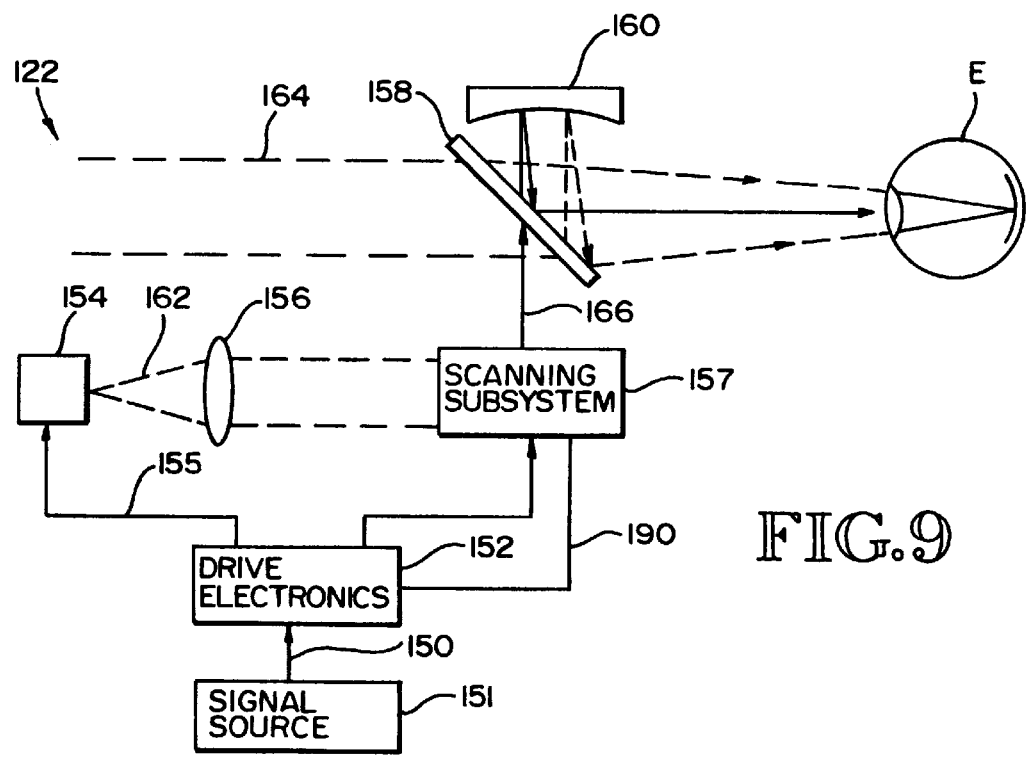
FIG. 9 is a block diagram of a virtual retinal display including a scanner of FIG. 2 or FIG. 6.

FIG. 9 is a block diagram of a retinal scanning display 122 which generates and manipulates light to create color or monochrome virtual images having narrow to panoramic fields of view and low to high resolutions. The display 122 includes drive electronics 152, one or more light sources 154, a lensing or optics subsystem 156, and a scanning subsystem 157. In some embodiments the display 122 also includes a beam splitter 158 and/or an eyepiece 160.

The display 122 receives an image signal 150 from an image source 151, such as a computer device, video device or other digital or analog image data source. The image signal 150 is an RGB signal, NTSC signal, VGA signal or other formatted color or monochrome video or image data signal. Drive electronics 152 generate signals 155 for controlling the light source 154. The light source 154 includes one or more point sources of light. In one embodiment red, green, and blue light sources, such as lasers or light emitting diodes, are included. Preferably the emitted light 162 is spatially coherent. In one embodiment the light source 154 is modulated based upon the signal 155 received. In another embodiment the light source includes a modulator which responds to the signal 155 received to modulate the light. The timing of the signal 155 corresponds to the mirror positions of the scanning subsystem 157. By outputting a known light color at known mirror positions vertical and horizontal location of an image pixel are defined. The light 162 output from the light sources 154 thus is modulated according to image data content and timing within the image signal 150. Such modulation and timing defines image elements or image pixels at desired locations within a scanning pattern.

The light 162 is output to the lensing system 156 and the scanning subsystem 157. The scanning subsystem 157 includes a horizontal scanner and a vertical scanner. Either one or both of such scanners are embodied by the scanner 40. Alternatively the horizontal and vertical scanner are embodied by the dual axis scanner 140. In another embodiment, one of the scanner is embodied by a mechanical resonator for deflecting passing light. Typically the light is scanned along a raster pattern, although in an alternative embodiment another display format such as vector imaging can be used.

The scanning subsystem 157 deflects the light along a raster pattern toward the eye E, or as in the embodiment illustrated, toward a beam splitter 158 and concave mirror 160. The beam splitter 158 is useful for an augmented display which passes both background light 164 and image light 166 to the viewer's eye E. The concave mirror 160 serves to focus the light. The image pixels scanned onto the viewer's eye define a virtual image. The virtual image is updated and rescanned periodically so that the viewer perceives a continuous image.

Meritorious and Advantageous Effects

One advantage of this invention is that a piezoelectric drive actuator is light in weight and small in volume relative to prior conventional drive circuits formed with electromagnets and permanent magnets. An advantage of the spring quality and restoring force is that a resonant 'pendulum-like' system is achieved by adding a relatively small proportion of energy to the system at each swing (e.g., rotation or twist).

Although a preferred embodiment of the invention has been illustrated and described, various alternatives, modifications and equivalents may be used. Although the scanning subsystem is described as employing a torsionally flexed spring plate, a variety of other pivoting mechanisms, such as a bending spring or a rotating axle may be used to support the mirror. Further, although the scanning subsystem is preferably a resonantly oscillating device, the display may include a non-resonant piezoelectric scanner and be within the scope of the invention. Moreover, although the scanning subsystem is described as a multi-component assembly, integral structures, such as microelectromechanical devices, may be used. Additionally, although the scanner is described herein for use in a scanning retinal display, the scanner may also be used in a variety of other applications. For example, the scanner may be used in place of a conventional scanning assembly of a one or two dimensional symbol scanner for scanning bar codes and other one or two dimensional symbols. Also, although the exemplary display described herein is a personal display, one skilled in the art will recognize that other types of displays, such as projection displays are within the scope of the invention. Therefore, the foregoing description should not be taken as limiting the scope of the inventions which are defined by the appended claims.

What is claimed is:

1. An optical scanner, comprising:
   a scanning signal source generating a periodic scanning signal;
   a scanner body;
   an elongated support mounted to the scanner body and movable relative to the scanner body, the support having a longitudinal axis;
   a piezoelectric driver coupled to the support and configured to move the support through a predetermined angular range about an axis of rotation responsive to the scanning signal; and
   a mirror which moves with the support about the axis of rotation, the axis of rotation being perpendicular to the longitudinal axis of the support;
   in which the support has a first portion and a second portion located at opposing sides of the mirror along the longitudinal axis, in which the piezoelectric driver comprises a first piezoelectric volume in contact with a first surface of the first arm, a second piezoelectric volume in contact with a second surface of the first arm, a third piezoelectric volume in contact with a first surface of the second arm, and a fourth piezoelectric volume in contact with a second surface of the second arm, wherein the periodic scanning signal is received at the first volume and the fourth volume, and wherein the periodic scanning signal is inverted and received at the second piezoelectric volume and the fourth piezoelectric volume.

2. An optical scanner, comprising:
   a scanning signal source generating a periodic scanning signal;
   a scanner body;
   an elongated support mounted to the scanner body and movable relative to the scanner body, the support having a longitudinal axis;
   a piezoelectric driver coupled to the support and configured to move the support through a predetermined angular range about an axis of rotation responsive to the scanning signal; and
   a mirror which moves with the support about the axis of rotation, the axis of rotation being perpendicular to the longitudinal axis of the support;
   in which the scanning signal source is a first scanning signal source, the support is a first support having a first longitudinal axis, the piezoelectric driver is a first piezoelectric drive, and the axis of rotation is a first axis of rotation, and further comprising:
     a second scanning source generating a second periodic scanning signal, and
     a second elongated support mounted to the scanner body and movable relative to the scanner body, the second support having a second longitudinal axis orthogonal to the first longitudinal axis of the first support;
     a second piezoelectric driver coupled to the second support and configured to move the second support through a predetermined angular range about a second axis of rotation responsive to the second scanning signal, the second axis of rotation perpendicular to the first axis of rotation; and
     a mirror which moves with the first support about the first axis of rotation and with the second support about the second axis of rotation, the first axis of rotation being perpendicular to the first longitudinal axis and the second axis of rotation being perpendicular to the second longitudinal axis.

3. An optical scanner for a display, comprising:
   a scanning signal source generating a periodic scanning signal;
   a scanner body;
   an elongated support mounted to the scanner body and movable relative to the scanner body, the support having a longitudinal axis;
   a piezoelectric driver coupled to the support and configured to move the support through a predetermined angular range about an axis of rotation responsive to the scanning signal; and
   a mirror which moves with the support about the axis of rotation, the axis of rotation being perpendicular to the longitudinal axis of the support;
   in which the support has a first portion and a second portion located at opposing sides of the mirror along the longitudinal axis, in which the piezoelectric driver comprises a first piezoelectric volume in contact with a first surface of the first arm, a second piezoelectric volume in contact with a second surface of the first arm, a third piezoelectric volume in contact with a first surface of the second arm, and a fourth piezoelectric volume in contact with a second surface of the second arm, wherein the periodic scanning signal is received at the first volume and the fourth volume, and wherein the periodic scanning signal is inverted and received at the second piezoelectric volume and the fourth piezoelectric volume.

4. An optical scanner for a display, comprising:
   a scanning signal source generating a periodic scanning signal;
   a scanner body;
   an elongated support mounted to the scanner body and movable relative to the scanner body, the support having a longitudinal axis;
   a piezoelectric driver coupled to the support and configured to move the support through a predetermined angular range about an axis of rotation responsive to the scanning signal; and
   a mirror which moves with the support about the axis of rotation the axis of rotation being perpendicular to the longitudinal axis of the support;
   in which the scanning signal source is a first scanning signal source, the support is a first support having a first longitudinal axis, the piezoelectric driver is a first piezoelectric drive, and the axis of rotation is a first axis of rotation, and further comprising:
     a second scanning source generating a second periodic scanning signal, and
     a second elongated support mounted to the scanner body and movable relative to the scanner body, the second support having a second longitudinal axis orthogonal to the first longitudinal axis of the first support;
     a second piezoelectric driver coupled to the second support and configured to move the second support through a predetermined angular range about a second axis of rotation responsive to the second scanning signal, the second axis of rotation perpendicular to the first axis of rotation; and
     a mirror which moves with the first support about the first axis of rotation and with the second support about the second axis of rotation, the first axis of rotation being perpendicular to the first longitudinal axis and the second axis of rotation being perpendicular to the second longitudinal axis.

5. A scanning light beam display, comprising:

an image signal source operative to produce an image signal;

a light emitter coupled to the image signal source and responsive to the image signal to emit light;

a scanning signal source generating a periodic scanning signal; and a scanner responsive to the periodic scanning signal, including:
  a scanner body;
  an elongated support mounted to the scanner body and movable relative to the scanner body, the support having a longitudinal axis;
  a piezoelectric driver coupled to the support and configured to move the support through a predetermined angular range about an axis of rotation responsive to the scanning signal; and
  a mirror upon which the emitted light impinges and which is coupled for movement with the support about the axis of rotation, the axis of rotation being perpendicular to the longitudinal axis;

in which the scanning signal source is a first scanning signal source, in which the support is an integral cross-shaped structure having a first longitudinal axis and a second longitudinal axis which is orthogonal to the first longitudinal axis, in which the piezoelectric driver is a first piezoelectric driver, and in which the axis of rotation is a first axis of rotation, and further comprising;

a second scanning source generating a second periodic scanning signal;

a second piezoelectric driver coupled to the support and configured to move the support through a predetermined angular range about a second axis of rotation responsive to the second scanning signal, the second axis of rotation perpendicular to the first axis of rotation; and wherein the mirror moves about the first axis of rotation and about the second axis of rotation, the first axis of rotation being perpendicular to the first longitudinal axis and the second axis of rotation being perpendicular to the second longitudinal axis.

6. A scanning light beam display, comprising:

an image signal source operative to produce an image signal;

a light emitter coupled to the image signal source and responsive to the image signal to emit light;

a scanning signal source generating a first periodic scanning signal and a second periodic scanning signal; and a two-axis scanner, including:
  a scanner body;
  a first elongated support mounted to the scanner body and movable relative to the scanner body, the first support having a first longitudinal axis;
  a second elongated support mounted to the scanner body and movable relative to the scanner body, the second support having a second longitudinal axis orthogonal to the first longitudinal axis of the first support;
  a first piezoelectric driver coupled to the first support and configured to move the first support through a predetermined angular range about a first axis of rotation responsive to the first periodic scanning signal;
  a second piezoelectric driver coupled to the second support and configured to move the second support through a predetermined angular range about a second axis of rotation responsive to the second periodic scanning signal, the second axis of rotation being orthogonal to the first axis of rotation; and
  a mirror which moves with the first support about the first axis of rotation and with the second support about the second axis of rotation, the first axis of rotation being perpendicular to the first longitudinal axis, the second axis of rotation being perpendicular to the second longitudinal axis.

7. The display of claim 6, in which the image signal source is operative to produce an RGB image signal, and further comprising an RGB light source, the RGB light source including the light emitter.

8. The display of claim 6, in which the light emitter is a laser light source.

9. The display of claim 6, in which the light emitter is a light emitting diode.

10. The display of claim 6, in which the mirror is integral to the support.

11. The display of claim 6, in which the support is metal.

12. The display of claim 6, in which the emitted light reflects off the mirror, the display further comprising eye coupling optics which receive the reflected light and direct the reflected light toward an eye.

13. The display of claim 6, further comprising control electronics which synchronize the first periodic scanning signal and the image signal and which synchronize the second periodic scanning signal and the image signal.

14. The display of claim 6, in which the first support and second support are formed as an integral cross-shaped structure.

15. A method of scanning an optical beam responsive to a scanning signal, comprising the steps of:

receiving the optical beam with a mirror coupled to an elongated support, the elongated support having a longitudinal axis;

during a first portion of a first drive cycle of the scanning signal, driving motion of the support in a first direction about an axis of rotation to a first extreme position in response to the scanning signal, wherein the axis of rotation is orthogonal to the longitudinal axis;

during a second portion of a first drive cycle of the scanning signal, driving motion of the support in a second direction about the axis of rotation opposite the first direction to a second extreme position in response to the scanning signal;

sensing flexure of the support along the longitudinal axis; and repeating the steps of receiving, driving in a first direction, driving in a second direction and sensing for subsequent drive cycles to generate oscillatory motion of the support in alternating first and second directions during the respective first and second portions of said subsequent drive cycles causing the mirror to oscillate through a selected angular range.

16. A method of scanning an optical beam responsive to a scanning signal, comprising the steps of:

receiving the optical beam with a mirror coupled to an elongated support, the elongated support having a longitudinal axis;

during a first portion of a first drive cycle of the scanning signal, driving motion of the support in a first direction about an axis of rotation to a first extreme position in response to the scanning signal, wherein the axis of rotation is orthogonal to the longitudinal axis;

during a second portion of a first drive cycle of the scanning signal, driving motion of the support in a second direction about the axis of rotation opposite the first direction to a second extreme position in response to the scanning signal;

sensing acceleration of the mirror;

performing common mode rejection on the sensed acceleration to determine acceleration of the mirror along the first direction and second direction; and repeating the steps of receiving, driving in a first direction, driving in a second direction, sensing and performing for subsequent drive cycles to generate oscillatory motion of the support in alternating first and second directions during the respective first and second portions of said subsequent drive cycles causing the mirror to oscillate through a selected angular range.

17. The method of claim 16, further comprising the step of synchronizing the steps of driving in a first direction and driving in a second direction to zero crossings in the sensed, common mode rejected acceleration.

18. A method of scanning an optical beam along a raster pattern having a first raster axis and a second raster axis, comprising the steps of:

receiving the optical beam at a mirror coupled to a first elongated support and a second elongated support, the first elongated support having a first longitudinal axis, the second elongated support having a second longitudinal axis orthogonal to the first longitudinal axis;

receiving a first scanning signal at a first piezoelectric drive actuator located at the first support, the first scanning signal having a first period;

during a first portion of the first period of the first scanning signal, driving motion of the first support in a first direction about a first axis of rotation to a first extreme position in response to the first scanning signal, wherein the first axis of rotation is orthogonal to the first longitudinal axis;

during a second portion of the first period of the first scanning signal, driving motion of the first support in a second direction about the first axis of rotation opposite the first direction to a second extreme position in response to the first scanning signal;

repeating the steps of receiving the first scanning signal, driving the first support in a first direction and driving the first support in a second direction for subsequent periods of the first scanning signal to generate oscillatory motion of the first support in alternating first and second directions about the first axis of rotation during the respective first and second portions of said subsequent periods of the first scanning signal causing the mirror to oscillate through a first selected angular range about the first axis of rotation and the optical beam to be reflected along the first raster axis of the raster pattern;

receiving a second scanning signal at a second piezoelectric drive actuator located at the second support, the second scanning signal having a second period;

during a first portion of the second period of the second scanning signal, driving motion of the second support in a third direction about a second axis of rotation to a first extreme position of the second support in response to the second scanning signal, wherein the second axis of rotation is orthogonal to the second longitudinal axis;

during a second portion of the second period of the second scanning signal, driving motion of the second support in a fourth direction about the second axis of rotation opposite the third direction to a second extreme position of the second support in response to the second scanning signal; and repeating the steps of receiving the second scanning signal, driving the second support in a third direction and driving the second support in a fourth direction for subsequent periods of the second scanning signal to generate oscillatory motion of the second support in alternating third and fourth directions about the second axis of rotation during the respective first and second portions of said subsequent periods of the second scanning signal causing the mirror to oscillate through a second selected angular range about the second axis of rotation and the optical beam to be reflected along the second raster axis of the raster pattern.

19. The method of claim 18, in which the first support and second support are one integral structure, and wherein the mirror oscillates through the first selected angular range at a resonant frequency of the mirror and said one integral structure.

20. The method of claim 18, further comprising the step of sensing flexure of the first support along the first longitudinal axis.

21. The method of claim 18, further comprising the steps of sensing acceleration of the mirror and performing common mode rejection on the sensed acceleration to determine acceleration of the mirror along the first direction and second direction.

22. The method of claim 21, further comprising the step of synchronizing the steps of driving in a first direction and driving in a second direction to zero crossings in the sensed, common mode rejected acceleration.

* * * * *